May 21, 1957     T. H. NAKKEN     2,792,750
PHOTOGRAPHIC OBJECTIVE COMPRISING AIR SPACED
AXIALLY ALIGNED POSITIVE AND NEGATIVE LENSES
Filed Sept. 10, 1953

INVENTOR.
THEODORE H. NAKKEN.
BY
ATTORNEY.

United States Patent Office 2,792,750
Patented May 21, 1957

2,792,750

PHOTOGRAPHIC OBJECTIVE COMPRISING AIR SPACED AXIALLY ALIGNED POSITIVE AND NEGATIVE LENSES

Theodore H. Nakken, New York, N. Y.

Application September 10, 1953, Serial No. 379,364

4 Claims. (Cl. 88—57)

This invention relates to improvements in optics, and has as a principal object the provision of photographic objectives which are capable of producing photographs which convey the impression of being more natural in aspect than those produced by existing photographic objectives.

This and other objects of my invention will be readily apparent to those versed in the art by a perusal of this specification and a study of the accompany drawings:

Referring now to the drawings,

Figure 1 is a diagrammatic representation of what occurs when an eye views a scene through a negative lens;

Figure 2 is a diagrammatic representation of the functions in so-called telephoto objective;

Figure 3 diagrammatically shows the formation of a real image by means of a normal biconvex lens;

Figure 4 represents, diagrammatically, the manner in which a real image is created by two normal biconvex lenses spaced apart axially;

Figure 5 is a simplified diagrammatic representation of the image formation as same takes place in a Galilean telescope or opera glass;

Figure 6 is a representation of a Taylor triplet objective;

Figure 7 is a representation of the Chevalier meniscus objective;

Figure 8 is a diagrammatic representation of an objective according to the present invention.

Mankind has striven through the ages to faithfully represent his surroundings pictorially on a flat surface, whether such picturization was meant for religious purposes or for the satisfaction of creating pictures which were pleasing to the eye, as in paintings, or for the sake of preserving likenesses of persons or events, as in most cases involving modern photographic processes. Even in the earliest paintings discovered, representing animals and hunting scenes and from paleolithic times, for instance in caves near Altamira, Spain, and in the Dordoque region, evidence is found that same were executed by people with keen observation powers, many of whom were familiar with foreshortening effects, while some of these paintings were even made as sort of relief paintings in order to more nearly approach complete likeness with the animals and action depicted.

The physical laws underlying the geometric or linear perspective, however, were formulated only as late as the middle of the 15th century in the city of Florence. From that time on it was realized, as first pointed out by Leonardo da Vinci, that if one looks at a painting or drawing executed in strict accordance with these laws, with a single eye placed in the center of perspective, one observes all objects and details therein with exactly the same apparent sizes as such single eye would have seen in reality. Under these conditions the picture even takes on an appearance of three-dimensionality, which it loses when seen from another viewpoint or when viewed binocularly. Hence, it is generally believed that the geometric perspective is the best possible way to represent three-dimensional reality on a flat plane.

It was soon realized that a convex lens tends to project, on a plane surface, an image, possessed of this geometric perspective. This led to the development of the camera obscura, first used by painters to obtain preliminary geometric sketches by tracing the outlines of objects and scenes to be painted on the screen used in said device.

Although in modern times painters tend to depart from the formerly so highly desired faithful reproduction of their scene, this part is at present taken over by the photographic and allied arts. It is assumed that photographic pictures are as faithful representations of scenes and events as can be produced in a single image on a flat plane. It is held to be axiomatic that true representation of three dimensional space on a flat surface is an impossibility, except by the use of stereoscopic means, which make it possible to view two parallaxially differentiated pictures of the same scene with every appearance of three dimensionality.

The often experienced dissatisfaction in viewing photographs, due to the impression of flatness generally created by such pictures, is accepted as an unavoidable evil, which can be avoided only by having recourse to steroscopic means. Helmholtz' suggestion that there might be a special kind of perspective, which he called the stereoscopic one, was ridiculed. When Dr. Rudolph asserted that his "Plasmat" objective, made by Hugo Meyer, gave pictures which were more plastic, i. e. possessed three dimensional characteristics, his assertions were considered as being utterly fantastic. The average optical computer operates on the assumption that two objectives of the same focal length and the same degree of correction for the various aberrations will create identical pictures when used in a photographic camera. He therefore assumes likewise that, should pictures produced with a given objective be different in any way whatever from those produced by a "normal" objective, such difference must be due either to a higher or a less degree of correction present in the different objectives. As a matter of fact, for instance, Rudolph maintained that the alleged improved qualities of pictures made with Plasmat objectives were due to better corrections for chromatic aberrations than those incorporated in other contemporary photographic objectives.

This assumption of identical pictures, i. e. identical perspective, can be easily understood if one realizes that the constructor of photographic objectives does not, and could not possibly, attempt to design his objective for the purpose of imaging three dimensional space. Would he attempt to do so he would face what might be called an impossible and unending task.\ He is compelled to proceed, in his computations, from a limited data. For instance, if it is his purpose to construct a one to one process lens, he bases his construction and calculations on that fact. The projected objective will be required to produce, on a flat plane, called the image plane, a faithful image of a design of any nature whatsoever, which design is placed on a second flat plane called the object plane. In this case it would be of supreme indifference to him whether a design on any other flat plane would be reproduced faithfully or not.

On the other hand, if he intends to design an objective for normal photographic purposes, he assumes his object plane as being located at an infinite distance away, so that light pencils emanating from points in said object plane arrive at and enter into the objective in the shape of parallel rays. He can assume one or more object planes as a checkup, in order to find out how faithfully a pattern on such plane will be reproduced on or adjacent to the image plane, however, such checkup is generally deemed unnecessary. Hence, starting with a flat object plane, it is obvious that the assumption that objectives with the same degree of correction will produce identical patterns on the image plane must be completely true. It is my conviction that this is the reason why objective designers hold the beliefs mentioned above, and tend to scoff at the idea that "ideally corrected" objectives may produce photographic images of different nature.

I therefore believe that I am justified in stating that I have discovered totally neglected factors in objective design when I realized that the image which is projected onto the sensitive film in the average camera is not a real image of reality as "seen" by the objective, but a real image, created by the final lens surface, of a previous, intermediary image created by the penultimate lens or lens surface in the objective. Likewise, I realized that, in turn, this final intermediary image was created by the antepenultimate lens or surface of an antepenultimate intermediary image, and so forth, depending on the number of lenses or rather curved surfaces in the objective. Thus I realized, as a final conclusion, that only the first intermediary image, created by the first curved surface of the objective, is an image created directly by a lens or curved surface "looking at" reality.

Once having realized the facts, it becomes but natural to inquire what happens, if anything, as a consequence of the appearances or existence of these successive intermediary images. In order to make my meaning completely clear, I use the concept that every curved surface or lens "looks at" the image created by a previous surface or lens, using it either as a real or virtual object, and creates a new image thereof. Moreover, the moment one departs from the computer's "object plane" as the foundation of a computation, one realizes that one deals, in an objective, with three-dimensional entities, the intermediary and final images, and that these entities may introduce, and do introduce, variants which, to the best of my knowledge, never have been taken into account in objective design.

Referring now to Figure 1, and eye 11 looking, from a distance $aF$ through a negative lens 12 of focal length $-F$ at an object 13 of size S at a distance D in front of lens 12. In the above symbol $a$ represents a numeral, which may have a value, for instance .1, .2, .5, 1, 2 or more.

Applying the fundamental formula for conjugate focal points one realizes that eye 11 will observe a virtual image 14, placed at a distance $$\frac{DF}{D+F}$$

in front of lens 12, and that his image must have a size of $$\frac{SF}{D+F}$$

Again, one finds that all light rays (as 15) emanating from points located in object 13 enter eye 11 only after being refracted by lens 12, and that such rays would normally have crossed one another in a point 15. This point 15 may be called the equivalent viewpoint for eye 11 and lens 12, and is found by means of the same formula, to be located at a distance $$\frac{aF}{aF^2+F} \text{ or } \frac{aF}{a+1}$$

behind lens 12.

An eye, placed at point 15, would see object 13 at a distance of $$D+\frac{aF}{a+1}$$

and with an apparent size of $$\frac{S}{D+\frac{aF}{a+1}}$$

or $$\frac{(a+1)S}{aD+D+aF}$$

On the other hand, image 14 with a size of $$\frac{SF}{D+F}$$

is seen, by eye 11, at a distance of $$aF+\frac{FD}{D+F}$$

and thus with an apparent size of $$\frac{\frac{SF}{D+F}}{aF+\frac{FD}{F+D}}$$

or $$\frac{S}{aD+D+aF}$$

Hence then it is found that the apparent sizes observed by eye 11 through negative lens 12 are $(a+1)$ times smaller than those seen by eye in equivalent viewpoint 15, and that this diminution is valid for any and all objects, no matter what their size S or distance D from the lens 12. This fact is not new: a negative lens is known by the popular name of reducing glass.

There exists, however, a factor, which to the best of my knowledge, has never been properly expressed, i. e. the reasons for the pleasing impression made on the consciousness of the owner of eye 11, by the virtual image 14 as soon the term $a$ assumes a significant value. This owner is struck by the beautiful aspect of the image of the scene, and this sensation was ascribed, for instance by Von Helmholtz, to the fact that the virtual image is a perfect theatre model of the scene. This, of course, is not strictly true, as a theater model is constructed from a given center of perspective, which for the virtual image may be said to be located in point 15, and which varies with the distance $aF$ between lens 12 and eye 11: any change in this distance creates a new equivalent viewpoint 15. In constructing a model of said scene from any point other than its proper center of perspective, it would appear to be distorted. Such a model would have to be constructed in such a manner as to be apparently $(a+1)$ times deeper than the reality it is meant to represent, in other words, it would have to be a completely distorted model which can appear as "natural" only from its proper center of construction.

I have explained the related facts in more detail in a co-pending patent application Ser. No. 346,700, filed March 26, 1953. It seems sufficient, at this point, to state that the owner of eye 11 observes an image which is apparently $(a+1)$ times deeper than reality. Hence, if for eye 11 there were substituted a normal photographic objective, such objective would utilize image 14 as a real object and produce on a film in a camera, a picture of a scene $(a+1)$ times deeper than reality, regardless of characteristics said objective may impart to this picture of its own accord.

The above example will illustrate fully what I mean by the term: intermediary image: for such an objective image 14 would be an intermediary image.

Referring now to Figure 2, I show another striking example of the occurrence of an intermediary image in the so-called telephoto objective.

Such an objective consists of a positive front component 16 of focal length $f$ and negative rear component 19 of focal length $-F$. Its action, which is described in almost every textbook on physics or optics, is as follows:

Positive front lens 16 with a focal length $f$ forms, of an object 17 in the scene, a real image 18, at a distance beyond the location of negative lens 19. The focal length F of lens 19 is assumed to be greater than the distance between it and said real image. Image 18 now becomes the virtual object for lens 19, which enlarges it and produces a new real image 20, which is projected on the sensitive film in the camera, thus producing the final latent image in the emulsion of said film.

Assuming the distance of object 17 of size S from lens 16 to be D, its real image 18 will be formed at a distance $$\frac{Df}{D-f}$$

behind lens 19, and its actual size will be $$\frac{Sf}{D-f}$$

Assuming, moreover, that the distance between components 16 and 19, is $bf$, the negative lens component 19 will "see" its virtual object 18 of size $$\frac{Sf}{D-f}$$

from a distance $$\frac{Df}{D-f}-bf$$

and therefore with an apparent size of $$\frac{\frac{Sf}{D-f}}{\frac{Df}{D-f}-bf}=\frac{S}{D-bD+bf}$$

Real image 18 was formed, as stated, by positive component 16, directly from the real object 17; thus the object was "seen" by said component with an apparent size of $$\frac{S}{D}$$

Thus it is found, that the ratio of the apparent sizes as seen and imaged by components 16 and 19 becomes $$\frac{D-bD+bf}{D}$$

By ignoring the term $bf$, which normally is very small as compared to $bD$, this ratio becomes $$\frac{1-b}{1}$$

so that it may be stated that the final real image is a picture of a scene in which the apparent sizes are $$\frac{1}{1-b}$$

times larger than those seen in reality.

The term $b$ may easily have a value of .5, which would signify that the scene as seen, and imaged, by lens 19, shows apparent sizes twice as large as those seen in reality by component 16. Applying the same reasoning in investigating the inner meaning of this increase in apparent size, one finds that one would have to build a model with half the apparent depth of reality in order to be able to see such a model with such apparent sizes.

Incidentally, these facts proffer the explanation for the excessively flat appearance of photographs made with this kind of objective. While many people refuse to use telephoto lenses due to this flatness, to the best of my knowledge no one has ever vouchsafed an explanation of this phenomenon and, as a matter of fact, said flattening effect is denied or at least completely ignored by the makers of these devices.

Referring now to Figure 3, I have shown a biconvex lens 21 with a front surface 22 and a rear surface 23. It can be appreciated readily that even in this simple optical device the formation of a real image proceeds in two steps. First surface 22 forms, of an object (not shown) a real image 24, which acts as an intermediate image and serves as a virtual object for surface 23, which produces, of this image 24, the final real image 25. It is clear that here again the distance from surface 22 to 23 may be indicated by the form $bf$, if $f$ is the focal length of surface 22, and that for this reason the final image 25 can only be a picture of a scene which has only a depth which is $$\frac{1-b}{1}$$

times that of reality. No matter then how small the value of $b$, image 25 can never be a true picture of the actual scene being photographed, but must be a picture of the intermediary scene created by surface 22, which is therefore seen and projected on the film as the picture of a model with an apparent depth only $$\frac{1-b}{1}$$

times that of reality.

Referring now to Figure 4, I show two biconvex lenses 26 and 27 placed behind one another, a combination such as often occurs in optical devices, and in high speed photographic objectives.

Front and rear surfaces 28 and 29 of lens 26 and front surface 30 of lens 27 each create intermediary real images, which in each case are used as virtual objects by the subsequent surface; the rear surface 31 of lens 27 creating the final real image to be projected onto the film. Each one of the intermediary images is seen by the succeeding surface with increased apparent sizes, so that each time the intermediary image is seen with decreased apparent depth. Thus one perceives, that the image produced by the rear surface is subject to a flattening effect which may be expressed as the product of three such effects, each one of which may be expressed by the formula $$\frac{1-b}{1}$$

For the sake of simplicity I have indicated, in this figure, only a single intermediary step, i. e. the real image 32 formed by lens 26 which serves as the virtual object for lens 27, which thus forms the final real image 33.

It can be readily appreciated that in each successive step the value of the term $b$ tends to become more significant due to the decreasing backfocus, so that the cumulative decrease in depth of the intermediary images rapidly assumes considerable magnitude. This is due to the fact that the magnitude of $b$ (a number) is really determined by the backfocus of the previous surface in each case.

Referring now to Figure 5, I show still another example of change in depth in a final image due to the manner in which an intermediary image is seen by the lens or surface which forms the final image. This drawing shows a simplified diagrammatic representation of the image formation steps in the so-called Galilean telescope. Here positive front lens 34 forms intermediary real image 35, which is utilized, as a virtual object, by negative rear lens 36. Real image 35 lies beyond lens 36 by a distance equal to or larger than the focal length of this lens. Under these circumstances lens 36 forms, of this intermediary real image 36 an upright, enlarged virtual image 37, which will exhibit greatly enlarged apparent sizes, which, as shown hereinabove, signifies that the scene observed through this telescope is flattened to a very considerable degree. The term $b$ in this case may have almost any value between .5 and 1, and of course any increase in this value signifies a greater flattening effect in the final virtual image.

Referring now to Figure 6, I show an approximate reproduction of Figure 13 in Taylor's U. S. Patent No.

540,122, dated May 28, 1895. This objective, called a "Triplet," consists of equal positive front and rear lenses 38 and 39, and an intermediary negative lens 40, the power of which is equal and opposite to the sum of the powers of the front and rear lenses. Taylor pointed out that under these circumstances the final image produced by the aggregate will be stigmatic and lie in a flat plane, while corrections for coma, spherical aberrations and rectilinearity may be attained by judicious choice of glasses and bending of the two positive elements.

By correct use of the principles involved Taylor succeeded, in 1892, to attain the then unheard of speed of F/6.8 in his objectives, a feat which was considered to be impossible unless new kinds of optical glass should become available. Since that time Taylor succeeded, by various devices, to further increase the speed of his aggregates. Moreover, it may be stated that almost 90% of all modern photographic objectives are based on Taylor's principles, even if his name is never mentioned in connection therewith.

A moments consideration will make it clear that Taylor's triplet consists, in principle, of a Galilean telescope, formed by lenses 38, and 40, and that the final real image is created by rear element 39. Thus the final image, and pictures produced by this aggregate, are really representations of the enlarged, flattened virtual image 37 as shown in Figure 5. Hence one can no more wonder at the fact that in general a photograph makes the impression of being flat: it is, as I have shown, actually a picture of a new flattened model scene produced in the form of an intermediary image, and not, as is generally believed, a picture of the actual scene it is desired to photograph.

Referring now to Figure 7, I have shown the Chevalier or French landscape lens, which has been in general use for approximately a century. This lens comprises two cemented lenses 41 and 42, the concave surface 43 of which faces the object to be photographed while the convex rear surface 44 faces the film. Diaphragm 45 is placed in front of the lens and serves the purpose of artificially flattening the image field. The lens can be used with a speed no higher than F/12, which, together with its low cost, is the reason why this lens is used only in the low-priced type of box camera. The concave front surface 43 forms a virtual image in front of the camera, which serves as a real object for convex surface 44. It is then apparent that this lens functions in a manner which is analogous to Figure 1, and that surface 44 sees a model deepened by $(a+1)$, even though the value of $a$ may be as low as .05 or even less, so that the deepening of the model as seen by the rear surface amounts only to 1.05 times more or less.

Notwithstanding, under good lighting conditions this lens produces pictures of surprisingly good quality which, in their appeal to the viewer, tend to surpass pictures made with "better" objectives, even though sometimes such pictures prove to be slightly amiss in the matter of rectilinearity. The fact remains that many people of discernment prefer to use this lens rather than the more expensive ones.

From the foregoing analysis of the formation of the final real image to be projected on the sensitive film it will have become apparent, that the successive steps by which this image is created, i. e. the manner in which the various intermediate images are viewed by the subsequent surfaces or lenses, is very important for the appearance of the final picture produced on the film. Three general rules may be stated to exist:

1. Whenever the intermediate image is a virtual one, it is seen as a real object by the subsequent surface or lens with apparent depth which can be expressed as having a magnitude of $(a+1)$ times the depth of reality or of the previous intermediate image.

2. Whenever the intermediate image is a real one it is used as a virtual object by the subsequent surface or lens with an apparent depth which can be expressed as having a magnitude of $$\frac{1-b}{1}$$

times the depth of reality or of the previous intermediate image.

3. Whenever a plurality of intermediate images occurs in a photographic objective, the final real image projected onto the sensitive film will be an image of the last intermediary image as seen by the last surface or lens of such objective, which final real image will be a picture of a model which can be expressed as having an apparent depth which is the product of all previous relative depths $(a+1)$ and $$\frac{1-b}{1}$$

Of course, in some optical instruments such as the terrestrial telescope with or without an erecting system, the case may occur that an intermediate real image serves as the real object for the subsequent surface or lens, but this case is at present of little or no importance when considering the behavior of photographic objectives per se.

By now, those skilled in the art will have grasped that a valid generalization may be stated with respect to photographic objectives; all commercial devices of this nature, i. e. "normal" and "telephoto" objectives tend to produce a final real image on the photographic film which results in a picture which is the representation of a model scene. In this scene the apparent depths are less than those existing in reality, and for this reason such pictures give the impression of being flat.

Those interested in the art may easily compute the flattening effect which occurs in any modern objective, such as the Cooke, the Tessar and other objectives, with the aid of the above formulas.

There is an exception to this rule, the so-called wide angle lens, using a negative front lens or aggregate placed at a considerable distance from the positive aggregate, but this type of objective is of minor interest for "normal" use of the photographic camera. While here an initial deepening effect is experienced, generally most of this effect, however, is lost subsequently.

While for modern man the impression received from an ordinary photograph is one of rather disagreeable flatness, this does not prevent him from recognizing and even appreciating such pictures. On the other hand experience has shown, that for people not familiar with photographs, such as natives in India or Africa, the flattening effects, due to the reasons hereinabove described is of such importance as to result in complete failure to recognize even the most familiar persons or scenes.

This is due, of course, to the fact that normally man sees his surroundings binocularly, with the result that he observes special relationships, which in a flattened photograph are, of course, completely absent. I have proven, in the copending patent application mentioned herein above, that a high degree of "deepening" effect in the final intermediate image is essentially equivalent to the effects occurring in binocular stereoscopic vision, but I pointed out in said application that objective aggregates capable of such deepening effects as to produce stereoscopic single pictures are, of necessity, clumsy and impractical for normal use, where handiness and portability is a primary requirement.

However, the inherent attractive appearance of pictures made with the Chevalier lens proves that a picture made with an objective in which the final real image is formed by a final surface or lens which depicts a final intermediate image which actually is a slightly deepened model scene will, in every respect, surpass pictures made with the more refined photographic objective as available in commerce today. Hence, one object of my invention, is the provision of objectives which will produce such deepened and more natural images, and which lend themselves, unlike the Chevalier lens, to normal design and correction practices, and which can be produced with speeds such as are desired in the modern camera, with corrections as good as those in modern objectives of considerable speed, yet lend themselves to use on modern, highly portable cameras, can be achieved.

Referring now to Figure 8, I show a diagrammatic representation of a photographic objective according to my invention. A negative lens 46 is followed by a positive lens 47, a negative lens 48 and a final positive lens 49. The sums of the negative and positive powers of these lenses are the same, so that my aggregate will be, a priori, stigmatic and produce a flat image field. It is well known to those skilled in the art, that under such conditions the array will form a positive aggregate.

Dealing first with 46 and 47, and assuming lens 46 to have a focal length F, and the distance between these two lenses to be $aF$, lens 47 may have a focal length $F'$ which can be: $=(a+1)F; >(a+1)F; <(a+1)F$. If $F'=(a+1)F$, it will be clear that lens 47 will magnify the virtual image cast by lens 46 in such a manner that infinity is thrown back to infinity; if $F'>(a+1)F$, lens 47 will create a new virtual image which is located at a greater distance in front of lens 46 than the first real image; and if $F'<(a+1)F$ lens 47 will create a real image lying at a distance behind said lens 47. The more $F'$ approaches the value $(a+1)F$, the greater the distance to which, in the second and third case, respectively, the virtual and real images, respectively, will be projected. In both the first and second cases the enlarged virtual image will have an apparent depth $(a+1)$ times that of reality; on the other hand, in the third case the real image created will likewise have an apparent depth, when looked at from the principal point of lens 47, which is $(a+1)$ times greater than that of reality as seen from the equivalent viewpoint for the first two lenses 46 and 47. These facts are explained in full in connection with Figure 1.

As explained above, the object of my invention is to create an object which will produce a final real image which shall result in a picture of a deepened scene. It therefore is obvious that an attempt will be made to give $(a)$ as great a value as is consistent with portability and small size.

There are now two lenses of opposite sign, i. e. $-F$ and $+F$, so that their respective powers are $$-\frac{1}{F} \text{ and } +\frac{1}{F'}$$

In order to attain a combination which will be stigmatic and have a flat field, it follows that lenses 48 and 49 together must have combined powers which add up to $$\frac{1}{F'} - \frac{1}{F}$$

It is quite obvious that this sum can be attained in an infinite number of combinations of a negative and positive lens, because the sum of the powers of lenses 46 and 47 is, in the final instance, a number, and in all probability a negative number, as will be realized from the facts to be pointed out hereinafter.

In both the cases where $F'=(a+1)F$ or $>(a+1)F$ a virtual enlarged image will be created by lens 47. No matter then how small the distance between lens 47 and 48, this distance will cause a new factor $a$ to be created, which tends to create a second deepending effect of the intermediary virtual image which serves as the real object for lens 48. On the other hand, if $F<(a+1)$, lens 47 will create a real image, which will be seen by lens 48, with but $$\frac{1-a}{1}$$

times the depth as seen from lens 47. It is then seen, that in this case $a$ may have a considerable flattening effect, if $F'<<F$, and it is obvious that for the purposes of my invention this contingency should be avoided. My preferred construction then will adhere to either the first or second case, i. e. $F'=(a+1)F$ or $F'>((a+1)F$. In both of these cases negative lens 48 will produce a final virtual image which serves as a real object for lens 49.

Assume a focal length $F''$ for lens 48, then the distance between lenses 48 and 49 will once again introduce a factor $a$, which becomes, with a given separation between lenses, more significant as $F''$ decreases in value. These considerations are of course, fundamental and need no further elaboration.

In order to illustrate the infinite number of possible combinations which will satisfy the requirements of my invention and give considerable deepening effect in the viewing of the final virtual image by the final lens 49 I shall give two examples of the manner in which objectives according to the invention may be constructed.

*Example No. 1.*—Let lens 46 have a focal length of −80 mm. lens 47 of +100 mm., separation between principal points 20 mm. This combination will produce a virtual image, in which infinity is once more in infinity, while apparent depth seen by lens 48 will be 1.25× greater than those of reality, apparent sizes being 1.25 times smaller than, or ⅘ of those seen in reality.

If now lens 48 has a focal length of −100 mm., lens 49 of +80 mm. the conditions for a flat field and a stigmatic image are fulfilled.

While lenses 46 and 47 in combination are a zero power array, a separation of 20 mm. between lenses 48 and 49 will result in a positive aggregate with a focal length of $$\frac{-100 \times 80}{-100+80-20} = 200 \text{ mm.}$$

This aggregate will work as follows: lens 48 creates a third virtual image, infinity lying at 100 mm. in front of said lens, and 120 mm. from lens 49. Hence lens 49 will create a real image at a distance $v$, where $$\frac{1}{v} = \frac{1}{80} - \frac{1}{120} = \frac{1}{240}$$

so that the final real image (of infinity) will lie at 240 mm. behind lens 49. It will be quite obvious that in this case the apparent depth is increased 1.2 times.

Lenses 48 and 49 have a combined focal length of 200 mm., but this aggregate photographs the virtual image created by lenses 46 and 47 in combination, and in which apparent sizes are ⅘ of those seen in reality. It follows then that the equivalent focal length of the entire array becomes ⅘×200=160 mm., so that I have constructed, in this manner, an objective suitable, for instance, for a 4 x 5″ camera. This objective has a deepening effect, in total, of 1.25×1.20=1.5 times. Hence the aggregate will produce a photograph of rather strikingly deep appearance.

*Example No. 2.*—Let the focal lengths of lenses 46, 47, 48, and 49 be, respectively, −60 mm., +80 mm., −40 mm., and +24.4 mm. Under these conditions the sums of the negative and positive powers are the same but opposite, so that the final image will be stigmatic and have a flat field. If lenses 46 and 47 are separated 20 mm., they form a zero power array which reduces apparent sizes to ¾ of those seen in reality. If lenses 48 and 49 are separated 13.33 mm. apparent sizes once more will be reduced 1.33 times, while their combined focal length will be 41.8 mm. Due to the reduction in apparent sizes caused by lenses 46 and 47, the equivalent focal length of the complete aggregate equal ¾×41.8=31.25 mm. Total deepennig effect will be 1.33×1.33 or 1.77 times.

The final real image will be projected onto the sensitive photographic film at a distance of approximately 39.2 mm. Notwithstanding its short equivalent focal length the aggregate will cover a field of for instance 24×36 mm. or even larger. This objective is, therefore, eminently suitable for making slides of this format, which when projected on a large screen, will show very great appearance of actual depth.

I need not emphasize that corrections for coma, color and spherical aberrations, in combination with provisions for rectilineality, will have to be computed into objectives according to this invention in each individual design. In order to accomplish these corrections the designer may bend the individual lenses at will, use different glasses for the individual lenses, or if he so desires, use, instead of single lenses, chromatically and/or spherically corrected doublets. In the process of correction he may have to resort to constructions in which intermediary real images are formed, due to bending of individual lenses: in such cases, however, such real image formation can subtract at the most but a few percent from the ultimate deepening effects obtained in the final picture, as will be readily understood by those versed in the art.

Even the placing of the diaphragm will be dependent on the individual correction methods employed by the designer.

In this specification the term to the effect that a lens or lens element "sees" is taken to mean that said element sees the virtual image formed by the preceding element as a real object and forms therefrom another virtual image.

A virtual image occurring in a lens aggregate behaves, with respect to the subsequent lens element, as if it were a real object as far as concerns the subsequent lens; for and surface or lens reality no longer exists and has been replaced by the virtual image, i. e. the intermediate image formed by the preceding lens or surface.

In photographic objectives containing positive and negative lens aggregates, in which there may occur intermediate real images due to a single lens surface or one of the intermediate lenses or lens surfaces, the subsequent surface "sees" said real image from a distance, as nearly as physically possible, equal to the distance of the lens element or surface which formed said real image, and virtual images formed by any intermediate lens or lens surface are seen by the subsequent lens or surface from a distance which is greater than the distance between such image and the optical element which formed it by an amount which is as large as physically possible.

Although I have shown and described a photographic lens aggregate and a modification thereof, and have compared the same to the principles employed in the principal existing photographic objectives, I do not wish to be limited to the exact details shown and described, since many changes may be made in the arrangements, yet employing the principles which are herein described.

What I claim is:

1. A photographic objective array having a negative front lens with a focal length of $-F$, a positive lens spaced apart from said negative lens by a distance equal to $aF$ which functions to magnify a virtual image of a scene cast by said negative lens, a second negative lens spaced apart from said positive lens and having a focal length of $-F'$, and a second positive lens spaced a distance $a'F'$ to the rear of said last mentioned lens and having such focal length as to form a final real image of the virtual image created by said second negative lens whereby the product of $(a+1)$ and $(a'+1)$ is not less than 1.5 where $a$ represents a numerical factor having a value between .1 and 2 and $a'$ represents a numerical factor having a value of between .1 and 2.

2. A photographic objective array having a negative front lens with a focal length of $-F$, a first positive lens having a focal length equal to $(a+1)F$ and spaced apart from said negative lens by a distance equal to $aF$ which functions to magnify a virtual image of a scene cast by said negative lens, a second negative lens spaced apart from said positive lens and having a focal length of $-F'$ and a second positive lens spaced a distance $a'F'$ to the rear of said last mentioned lens and having such focal length as to form a final real image of the virtual image created by said second negative lens whereby the product of $(a+1)$ and $(a'+1)$ is not less than 1.5 where $a$ represents a numerical factor having a value between .1 and 2 and $a'$ represents a numerical factor having a value of between .1 and 2.

3. A photographic objective array having a negative front lens with a focal length of $-F$, a first positive lens having a focal length greater than $(a+1)F$ spaced apart from said negative lens by a distance equal to $aF$ which functions to magnify a virtual image of a scene cast by said negative lens, a second negative lens spaced apart from said positive lens and having a focal length of $-F'$, and a second positive lens spaced a distance $a'F'$ to the rear of said last mentioned lens and having such focal length as to form a final real image of the virtual image created by said second negative lens, whereby the product of $(a+1)$ and $(a'+1)$ is not les than 1.5 where $a$ represents a numerical factor having a value between .1 and 2 and $a'$ represents a numerical factor having a value of between .1 and 2.

4. A photographic objective array having a negative front lens with a focal length of $-F$, a positive lens spaced apart from said negative lens by a distance equal to $aF$ which functions to magnify a virtual image of a scene cast by said negative lens, a second negative lens spaced apart from said positive lens and having a focal length of $-F'$, and a second positive lens having a focal length smaller than $(a'+1)F'$ positioned at a distance $a'F'$ to the rear of said second negative lens and adapted to project a real image of the virtual image of a scene created by said second negative lens upon a carrier where $a$ presents a numerical factor having a value between .1 and 2 and $a'$ represents a numerical factor having a value of between .1 and 2.

References Cited in the file of this patent

UNITED STATES PATENTS

| | | |
|---|---|---|
| 1,053,128 | Gray | Feb. 11, 1913 |
| 1,168,873 | Florian | Jan. 18, 1916 |
| 1,463,132 | Graf | July 24, 1923 |
| 1,668,030 | Van Albada | May 1, 1928 |
| 1,777,262 | Hasselks et al. | Sept. 30, 1930 |
| 1,792,917 | Merte | Feb. 17, 1931 |
| 2,169,397 | Stanley | Aug. 15, 1939 |
| 2,185,221 | Nakken | Jan. 2, 1940 |
| 2,341,385 | Kingslake | Feb. 8, 1944 |
| 2,446,402 | Aklin | Aug. 3, 1948 |

FOREIGN PATENTS

| | | |
|---|---|---|
| 534,165 | France | Jan. 3, 1922 |
| 348,465 | Great Britain | May 14, 1931 |
| 676,946 | Germany | Feb. 12, 1940 |